United States Patent [19]
Jarvis et al.

[11] Patent Number: 5,401,597
[45] Date of Patent: Mar. 28, 1995

[54] BATTERY AND A METHOD OF MANUFACTURE THEREFOR

[75] Inventors: Christine R. Jarvis, Bredon; Robin J. Neat, Old Marston, both of Great Britain

[73] Assignee: Dowty Electronic Components Limited, Cheltenham, Great Britain

[21] Appl. No.: 64,572

[22] Filed: May 20, 1993

Related U.S. Application Data

[63] Continuation of Ser. No. 776,374, Jan. 24, 1992, abandoned.

[30] Foreign Application Priority Data

Mar. 29, 1990 [GB] United Kingdom ............... 9007104

[51] Int. Cl.$^6$ ..................... H01M 6/18; H01M 10/38
[52] U.S. Cl. .................................. 429/192; 29/623.5
[58] Field of Search ............... 429/192, 218, 224, 126; 29/623.5, 623.1, 50

[56] References Cited

U.S. PATENT DOCUMENTS

| | | |
|---|---|---|
| 4,118,549 | 10/1978 | Liang et al. |
| 4,816,357 | 3/1989 | Hope et al. ............... 429/192 |
| 5,017,444 | 5/1991 | Nakajima et al. ............ 429/218 |
| 5,030,523 | 7/1991 | Neat et al. ............... 429/50 |
| 5,089,027 | 2/1992 | Rossoll et al. ............ 29/623.2 |

FOREIGN PATENT DOCUMENTS

| | | |
|---|---|---|
| 0050975 | 5/1982 | European Pat. Off. |
| 0279554 | 8/1988 | European Pat. Off. |
| 63-289767 | 11/1988 | Japan. |
| 1366535 | 9/1974 | United Kingdom. |

Primary Examiner—Anthony Skapars
Attorney, Agent, or Firm—Young & Thompson

[57] ABSTRACT

A battery having at least one electrochemical cell, comprises a negative electrode, a positive electrode, and a solid electrolyte between and in contact with the electrodes. There is dispersed in the solid electrolyte (6) a material that is reactive with one of the electrodes. But the electrolyte in contact with that one electrode is free from this material.

11 Claims, 2 Drawing Sheets

BATTERY AND A METHOD OF MANUFACTURE THEREFOR

This application is a continuation of application Ser. No. 07/776,374, filed Jan. 24, 1992, now abandoned.

TECHNICAL FIELD

This invention relates to a battery and a method of manufacture therefor.

The use of certain materials in batteries, and of certain constructions of batteries can lead to problems with contamination in the battery, for example, in a battery which contains an alkali metal, such as lithium, water, either atmospheric or latent, can lead to oxidation of the alkali metal in the battery, possibly leading to malfunction or non-operation of the battery. In an attempt to alleviate this contamination problem, generally the component materials of the battery are thoroughly dried, and subsequent manufacturing operations are performed in a dry atmosphere. The performing of the subsequent operations is very important because certain component parts of the battery are highly hydroscopic in nature and would tend to draw into them the water vapour present in the atmosphere. As a consequence of the above, the production costs for manufacturing the battery are greatly increased.

Further, certain battery constructions do not make this possible, for example the use of volatile materials such as a mixture of propylene carbonate (PC) and ethylene carbonate (EC) in the battery, render the above mentioned production technique very difficult as the materials (PC/EC) will be driven off themselves by the drying operations.

DISCLOSURE OF THE INVENTION

The present invention is concerned with providing a battery, and method of manufacture therefor, in which the problems mentioned above are alleviated.

In accordance with a first aspect, the present invention consists in a method of manufacturing a battery having at least one electrochemical cell comprising forming a negative electrode, a positive electrode, and a solid electrolyte, and dispersing in the solid electrolyte a first material so that there is a concentration of zero or substantially zero of said first material in the vicinity of a second material of the battery with which it would otherwise react.

The electrolyte may be formed with a concentration gradient of said first material across it, or may be formed in two or more distinct layers having differing concentrations of the first material therein.

A method of manufacturing a battery in accordance with the present invention is particularly suited for use with batteries, such as lithium batteries, which contain volatile constituents such as propylene carbonate (PC) or ethylene carbonate (EC). This is because these volatile constituents or contaminants therein may react with another part of the battery such as lithium metal or alloy and adversely effect operation of the battery.

The method in accordance with the present invention is preferably used to manufacture batteries that operate at room temperature.

In accordance with a second aspect, the present invention consists in a battery having at least one electrochemical cell comprising a negative electrode, a positive electrode, and a solid electrolyte, the solid electrolyte having dispersed therein, a first material with a concentration of zero or substantially zero in the vicinity of a second material of the battery with which it would otherwise react.

In a preferred embodiment of the invention, the electrochemical cell comprises a negative electrode of lithium metal or metal alloy, a positive electrode of manganese dioxide ($MnO_2$), and a solid electrolyte of polyethylene oxide (PEO), having a mixture of propylene carbonate (PC) and ethylene carbonate (EC) and a lithium salt, such as lithium triflate ($LiCF_3SO_3$) dispersed therein, the mixture of propylene carbonate (PC) and ethylene carbonate (EC) being dispersed in the electrolyte so that the electrolyte in contact with the negative electrode is free from propylene carbonate (PC) and ethylene carbonate (EC) and any associated contaminants.

With this particular battery construction, the propylene carbonate (PC) and ethylene carbonate (EC) are volatile components which show a hydroscopic nature, and hence may contain a small amount of contaminant water. It is this water that needs to be isolated from the lithium to prevent oxidation of the lithium and deterioration of the operational characteristics of the battery.

Furthermore, because propylene carbonate (PC) and ethylene carbonate (EC) are both volatile, they would merely be driven off in any drying operation to get rid of water. Therefore, the addition of the propylene carbonate (PC) and ethylene carbonate (EC) subsequent to the drying operation, and the isolating of them from the lithium provides an ideal solution.

The manufacture of this preferred embodiment of the invention is preferably effected using the following steps; manufacturing in a dry atmosphere from dry materials of the separate components comprising a negative electrode a positive electrode, and solid electrolyte of polyethylene oxide (PEO) including a lithium salt, for example, lithium triflate ($LiCF_3SO_3$) but not containing propylene carbonate (PC) or ethylene carbonate (EC); applying to a surface of the solid electrolyte a mixture of propylene carbonate (PC) and ethylene carbonate (EC); assembling the components together so that the surface of the electrolyte coated with the propylene carbonate (PC) and ethylene carbonate (EC) is not in contact with the negative electrode, thereby to form the battery; and predischarging the battery at a temperature between 70° C. and 120° C.

At normal temperature and pressure, the propylene carbonate (PC) and ethylene carbonate (EC) applied onto the surface of the solid electrolyte slowly migrates into the body of polyethylene oxide (PEO) as well as into the positive electrode. However, the rate of migration is not sufficient to cause any problems with regard to the negative electrode. Now, by predischarging the battery between 70° C. and 120° C., the polyethylene oxide (PEO) is softened and more readily allows the migration of the propylene carbonate (PC) and ethylene carbonate (EC) across the polyethylene oxide (PEO) so that a substantially even distribution thereof will be attained. Simultaneously, the predischarging locks up any contaminants present in the propylene carbonate and ethylene carbonate mixture.

It will be appreciated by those skilled in the art that the invention may be used in any form of suitable electrochemical cell/battery where potentially interactive materials are present and where either it is necessary only to isolate the materials from one another prior to initial charging or discharging of the electrochemical cell/battery, as in the above example, or where it is necessary to maintain a longer period of separation.

The invention may be used in a wide range of situations and battery constructions, for example, any battery containing alkali metal in which water contamination may be a problem.

It should be noted that the thickness of electrolyte material acting to isolate the interacting materials from one another is not critical to the operation of the invention. However, when manufacturing a battery in accordance with the present invention, the thickness of the electrolyte material should be considered, and should always be sufficient to ensure that the required isolation occurs for the required duration of time. In most cases, this means the thickness may be relatively small in comparison to the thickness of the bulk of the electrolyte.

In a preferred embodiment of the present invention, the positive electrode comprises manganese dioxide ($MnO_2$) dispersed in a polymer material, such as that of the electrolyte.

The invention may be used with most forms of non-aqueous primary or secondary electrochemical cells.

BRIEF DESCRIPTION OF THE DRAWINGS

The invention will now be described by way of example with reference to the accompanying drawings, in which.

MODE OF CARRYING OUT THE INVENTION

Figure 1:
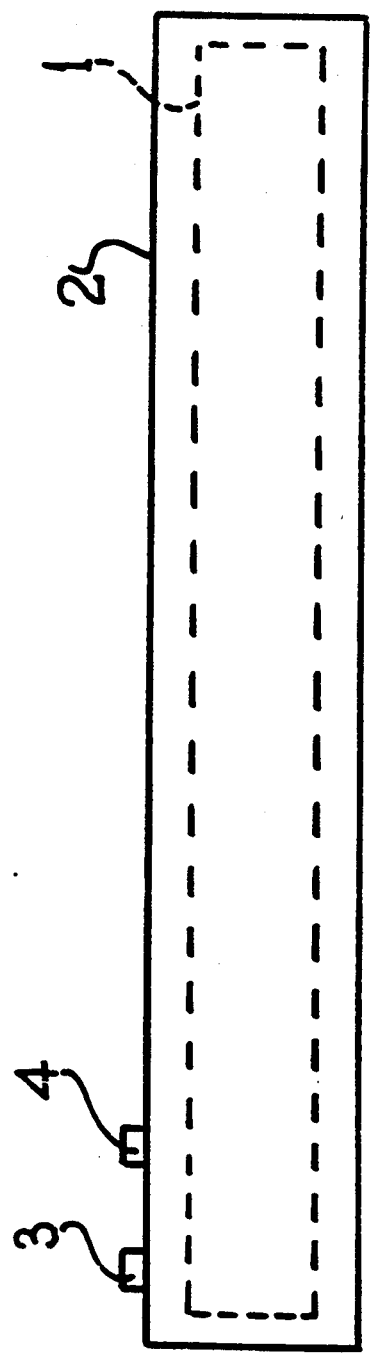
FIG. 1 shows a schematic view of a battery made in accordance with the present invention.

Now referring to FIG. 1 of the drawings, a solid state battery made in accordance with the present invention comprises a core member 1, a casing of non-porous water resistant material 2 which completely surrounds the core member 1, a negative terminal 3 which extends through the casing 2 and enables connection of the battery to a device, and a positive terminal 4 which extends through the casing 2 and enables connection of the battery to a device.

The negative and positive terminals 3 and 4 are hermetically sealed so as to prevent the core member 1 of the battery being open to the atmosphere, and are electrically insulated from one another.

Figure 2:
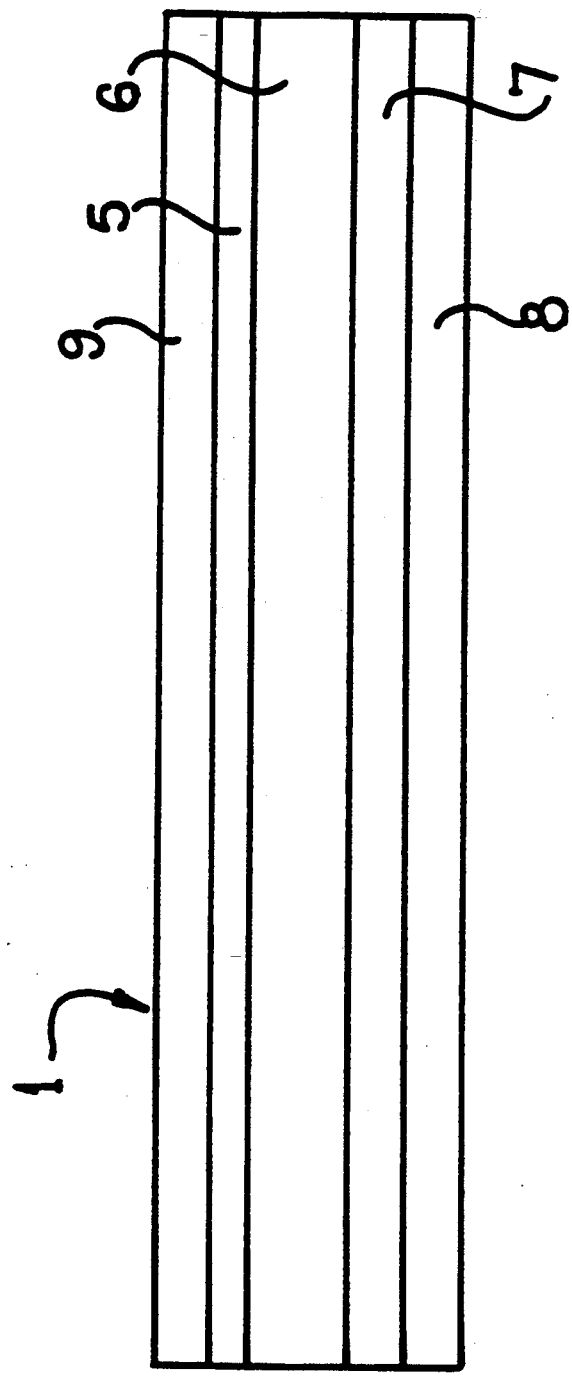
FIG. 2 shows a cross-section through the material of the core of the battery shown in FIG. 1.

Now referring to FIG. 2, the core member 1 of the battery shown assembled comprises four layers as follows.

A first layer 5 of lithium metal or a lithium alloy constitutes the negative electrode of the battery and is electrically connected to the negative terminal 3 of the battery. A second layer 6 constitutes the solid electrolyte of the battery and consists of polyethylene oxide (PEO) in which a lithium salt such as lithium triflate is dispersed, and across which extends from the first layer 5 to a third layer 7, a concentration gradient of ethylene carbonate (EC) and propylene carbonate (PC) such that in the vicinity of first layer 5 (negative electrode) the concentration of ethylene carbonate (EC) and propylene carbonate (PC) is zero or substantially zero. The third layer 7 constitutes the positive electrode of the battery and consists of manganese dioxide ($MnO_2$) active material dispersed in a polymeric material, for example, the solid electrolyte of the battery. A fourth layer 8 constitutes the current collector.

The above layered structure forms an electrochemical cell in the battery which provides the necessary electrochemical driving force.

The above described battery is manufactured using the following technique. The negative electrode 5, the positive electrode 7, the current collector 8 and the solid electrolyte 6 (not including the propylene carbonate (PC) and ethylene carbonate (EC) mix) are manufactured, thoroughly dried and held in a dry atmosphere. The negative electrode 5, and the solid electrolyte 6 are assembled, and the surface of the solid electrolyte 6 remote from the negative electrode 5 is applied with a mixture of propylene carbonate (PC) and ethylene carbonate (EC) of appropriate proportion in relation to the mass of electrolyte material. The positive electrode 7 and the current collector 8 are assembled with the negative electrode 5 and the solid electrolyte 6, to form a battery preform. The battery preform is now formed into the battery and is predischarged at 100° C.

We claim:

1. A method of manufacturing a battery having at least one electrochemical cell comprising a negative electrode, a positive electrode, and a solid electrolyte of polyethylene oxide between said electrodes, the method comprising dispersing a lithium salt in the solid electrolyte, and dispersing propylene carbonate and ethylene carbonate in the electrolyte only at a distance from the negative electrode, said propylene carbonate and ethylene carbonate being contaminated with water, the negative electrode being reactive with said water in the propylene carbonate and ethylene carbonate and being spaced from the propylene carbonate and ethylene carbonate by a portion of said solid electrolyte free from propylene carbonate and ethylene carbonate.

2. A method as claimed in claim 1, wherein said propylene carbonate and ethylene carbonate are provided as a coating on the surface of the electrolyte and migrate into the electrolyte.

3. A method as claimed in claim 2, wherein said coating is applied to a surface of the electrolyte which is opposite a surface of the electrolyte in contact with the negative electrode.

4. A method as claimed in claim 1, wherein the negative electrode is composed of lithium metal or lithium alloy.

5. A method as claimed in claim 1, in which the battery is predischarged at a temperature between 70° C. and 120° C. after being assembled.

6. A method as claimed in claim 1, in which the positive electrode comprises manganese dioxide dispersed in a polymer material.

7. A battery having at least one electrochemical cell comprising a negative electrode, a positive electrode, and a solid electrolyte of polyethylene oxide between said electrodes, a lithium salt dispersed in the solid electrolyte, and propylene carbonate and ethylene carbonate dispersed in the electrolyte only at a distance from the negative electrode, said propylene carbonate and ethylene carbonate being contaminated with water, the negative electrode being reactive with said water in the propylene carbonate and ethylene carbonate and being spaced from the propylene carbonate and ethylene carbonate by a portion of said solid electrolyte free from propylene carbonate and ethylene carbonate.

8. A battery as claimed in claim 7, wherein said propylene carbonate and ethylene carbonate are provided as a coating on the surface of the electrolyte and migrate into the electrolyte.

9. A battery as claimed in claim 8, wherein said coating is applied to a surface of the electrolyte which is opposite a surface of the electrolyte in contact with the negative electrode.

10. A battery as claimed in claim 7, in which the negative electrode is composed of lithium metal or lithium alloy.

11. A battery as claimed in claim 7, in which the positive electrode comprises manganese dioxide dispersed in a polymer material.

* * * * *